Oct. 23, 1945. M. F. ACKEN ET AL 2,387,488
TRINITROTOLUENE
Original Filed May 29, 1941
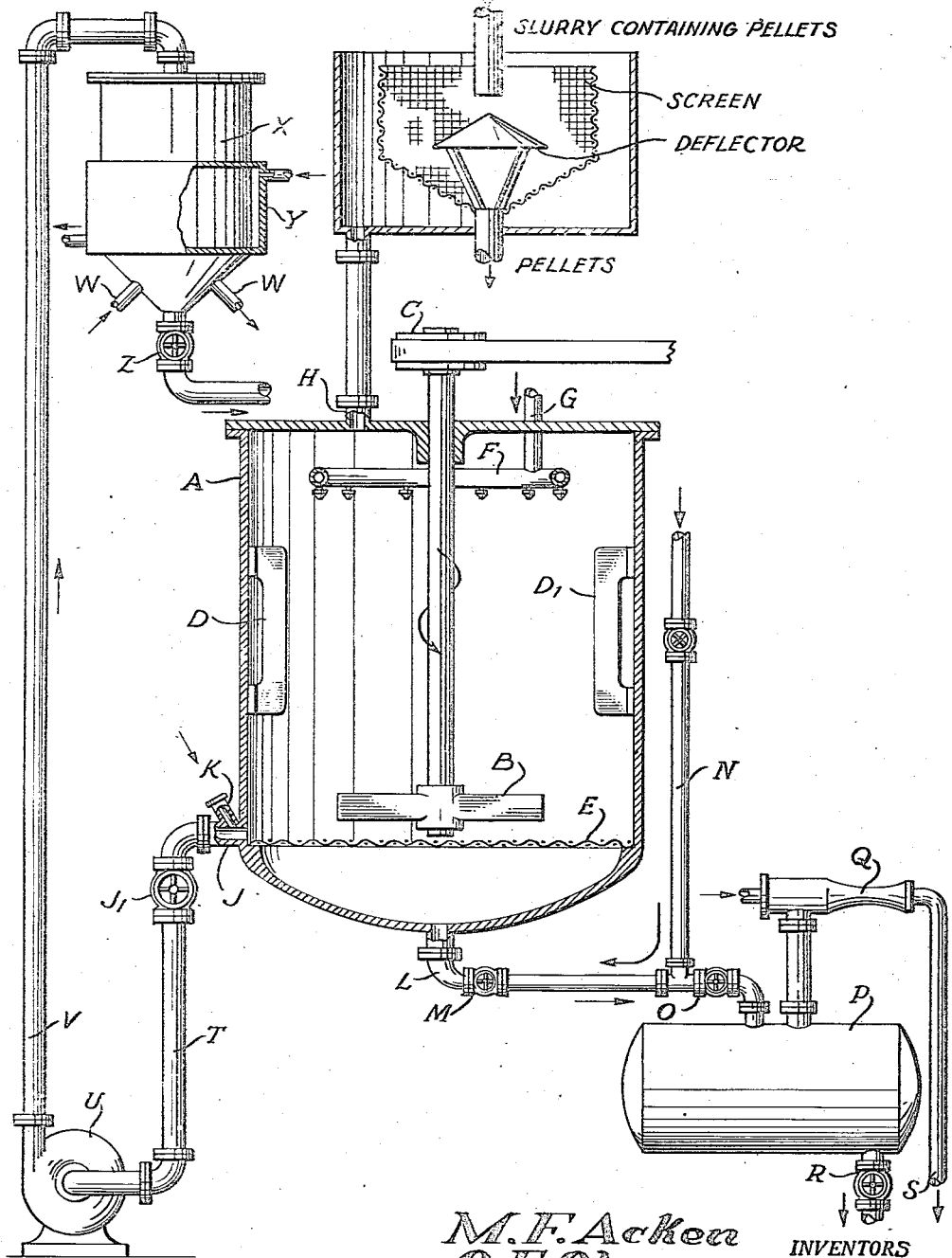
M. F. Acken
O. E. Olsen
INVENTORS
BY Thos. A. Wilson
ATTORNEY Patented Oct. 23, 1945

2,387,488

UNITED STATES PATENT OFFICE 2,387,488

TRINITROTOLUENE

Marshall F. Acken, Woodbury, N. J., and Oscar E. Olsen, Washburn, Wis., assignors to E. I. du Pont de Nemours & Company, Wilmington, Del., a corporation of Delaware Original application May 29, 1941, Serial No. 395,710. Divided and this application June 18, 1942, Serial No. 447,498

2 Claims. (Cl. 260—645)

This invention relates to the art of refining trinitrotoluene and other crystalline chemical compounds.

This application is a division of our copending application Serial No. 395,710, filed May 29, 1941.

In the manufacture of trinitrotoluene and certain other crystalline compounds, difficulties are encountered in the necessary filtration step. The handling of the filter cake involves certain disadvantages, especially where the material is either explosive or toxic.

The object of this invention is an improved process for the manufacture of trinitrotoluene. A further object is an improved process and apparatus adapted to facilitate the filtration of slurries of trinitrotoluene and other crystalline chemical compounds. Additional objects will be noted from the following detailed description of the invention.

The foregoing disadvantages are overcome and the objects obtained according to the invention, which comprises introducing into a filter vessel a slurry of crystalline trinitrotoluene suspended in sodium sulfite solution, filtering the liquid therefrom to produce a filter cake, washing said cake, introducing water into contact with the cake with agitation to produce a water slurry of the filtered, washed trinitrotoluene and discharging said slurry, preferably to a melter.

The invention may be more readily understood by referring to the accompanying drawing which represents a specific embodiment thereof. Figure I is a view in cross-section of apparatus suitable for carrying out the invention.

Referring in greater detail to this figure, the steel filter tank A is fitted with a fine mesh wire filter cloth E near the bottom thereof, said cloth being suitably reinforced on both sides. Within the tank is the agitator B of the flat paddle type which is located above and adjacent to the filter cloth. The tank is provided with baffles D, D₁ to promote turbulence during agitation. Spray nozzles are provided at F for the introduction of water supplied at conduit G. Inlet H is provided for the introduction of the slurry to be filtered. Near the bottom of the tank and above the filter cloth E is the outlet J and valve J' for the discharging of the refined slurry. There is also the small water inlet K cooperating with the outlet J for the removal of crystalline material which may obstruct J. Beneath the filter cloth is the outlet L for removal of filtrate and introduction of water entering through line N. The receiving tank P is connected to tank A through valves O and M. The melting tank X is connected to outlet J of tank A through conduit T and pump U.

The process comprising the preferred embodiment of the invention may be described as follows: Crude molten trinitrotoluene obtained from nitration and containing some free acid is given several hot water washes to remove said acid. It is then crystallized, preferably under water, as described in copending applications Serial No. 312,354, Knake case 1, filed January 4, 1940, and Serial No. 364,031, Olsen case 1, filed November 2, 1940.

The crystalline material is treated with sodium sulfite solution to remove undesirable isomers. The slurry of trinitrotoluene in sodium sulfite solution is pumped through the screening device depicted to remove the large lumps. In this device the slurry enters the screening device through a conduit, strikes the deflector and is thrown outward through the screen into the containing tank. The pellets strike the sides of the screen and drop to the opening in the bottom thereof and are removed through the conduit shown. The screened slurry is then introduced into the filter tank A through inlet H. The sodium sulfite liquor containing dissolved sodium salts of the isomers is then separated from the granular refined trinitrotoluene by filtration through the filter cloth E, the liquor flowing on through the bottom outlet L into receiving tank P. To facilitate filtration, suction is employed beneath the filter cloth by means of the vacuum jet Q, discharging through pipe S. The liquor is subsequently removed from the tank P through outlet R.

The cake of crystalline material wet with liquor remains on the filter. To remove the liquor, the cake is washed with water introduced through inlet G and spray nozzles at F. This wash water passes through the cake and filter cloth and through outlet L. When the washing is complete the valve O, on receiving tank P, is closed and water introduced through line N into the bottom of the filter. This water causes the cake of trinitrotoluene to be lifted off the filter cloth. At this time the rotation of agitator B is started by a suitable driving means, such as pulley C, and water is introduced through the spray nozzles at F. By means of the water sprays and the agitation, a water slurry of the refined trinitrotoluene is produced. To facilitate the formation of this slurry it may be desirable also to introduce water through additional jets which may be provided at convenient positions around the side of the tank close to the filter cake. Usually a satisfactory slurry is formed when the mixture contains from 40–50% of solids. This water slurry is then allowed to discharge through outlet J by opening valve J' from which point it may flow to a receiving vessel or to a pump for delivery to other operations in the process; for instance to an elevated melter tank X by way of conduits T and V. In the melter the slurry is heated by means of the steam jacket Y. Also live steam may be introduced into the material through inlets W to facilitate the melting operation and to provide agitation. When the trinitrotoluene is entirely melted the charge is allowed to settle, whereupon a layer of trinitrotoluene forms on the bottom and the water layer forms on top. The lower layer of molten trinitrotoluene is drawn out through the bottom outlet Z into the drying tank, where moisture is removed. The melt may then be flaked or crystallized as desired.

Although the invention has been described in the foregoing with respect to the refining of trinitrotoluene it will be appreciated that the process and apparatus of the invention are applicable as well to the refining or filtering of any material.

The invention is particularly advantageous for the treatment of materials which are explosive per se, such as trinitrotoluene, or for the treatment of materials which cannot be adapted to manual operations because of toxicity.

The particular screening device disclosed herein is not claimed as part of the present invention, but is disclosed and claimed in copending application Serial No. 432,277, filed February 25, 1942.

In the foregoing the preferred embodiment of the invention has been described. It should be understood, however, that many variations can be made without departing from the scope of the invention. For instance, whereas a vacuum jet has been described for the purpose of creating a suction beneath the filter, any other suitable suction means may be employed. Likewise any suitable fluid can be introduced beneath the cake in place of water for raising the same off of the filter cloth. Air could be forced up through the filter for this purpose. Likewise, with respect to the liquid employed, whereas a water slurry has been described it should be noted that any other suitable liquid is included within the scope of the invention. The invention is limited only by the following patent claims.

We claim:

1. The process of refining trinitrotoluene which comprises treating the trinitrotoluene in crystal form with sodium sulfite solution to form a slurry, filtering said slurry to form a filter cake, washing said cake, introducing water with mechanical agitation to comminute the cake in place on the filter to form a water slurry, said slurry being capable of flowing through a conduit.

2. The process of refining trinitrotoluene, which comprises treating the trinitrotoluene in crystal form with sodium sulfite solution to form a slurry, filtering said slurry to form a filter cake, washing said cake, introducing water with mechanical agitation to comminute the cake in place on the filter to form a water slurry, discharging said slurry, heating the slurry to melt the trinitrotoluene and form a layer of said molten trinitrotoluene, separating and cooling said molten layer to form solid trinitrotoluene.

MARSHALL F. ACKEN.
OSCAR E. OLSEN.